United States Patent [19]

Sun

[11] Patent Number: 4,631,870
[45] Date of Patent: Dec. 30, 1986

[54] CNC GRINDING MACHINE
[75] Inventor: Houng Sun, Hsin-Chu, Taiwan
[73] Assignee: Industrial Technology Research Institute, Hsin-Chu Sheng, Taiwan
[21] Appl. No.: 717,005
[22] Filed: Mar. 28, 1985
[51] Int. Cl.$^4$ .............................................. B24B 49/02
[52] U.S. Cl. .............................. 51/165.71; 51/165.87; 51/95 GH; 364/474
[58] Field of Search ........................ 364/474; 318/572; 51/165.71, 165 TP, 52 R, 52 HB, 56 G, 95 GH, 165.87

[56] References Cited

U.S. PATENT DOCUMENTS

| | | | |
|---|---|---|---|
| 3,916,569 | 11/1975 | Wydler | 51/52 R |
| 4,061,952 | 12/1977 | Dinsdale | 318/572 |
| 4,115,956 | 9/1978 | Huffman | 51/169.71 |
| 4,136,390 | 1/1979 | Farrell | 51/165.71 |
| 4,366,543 | 12/1982 | Feller | 364/474 |
| 4,467,568 | 8/1984 | Bloch | 51/52 R |
| 4,484,293 | 11/1984 | Minucciani | 364/474 |

Primary Examiner—Harold D. Whitehead

[57] ABSTRACT

A CNC grinding machine includes a base having a first plane surface which can be defined by two axes perpendicular with each other, a work station driven by a first servomechanism to be capable of moving on the first plane surface and rotating about a third axis perpendicular to the first plane surface, a grinding wheel driven by a second servomechanism to be capable of moving along a first line perpendicular to the first plane surface and rotating about a fourth axis perpendicular to a second plane surface having a normal line parallel to the first plane surface, a grinding wheel dresser for dressing the grinding wheel, a measuring probe driven by a third servomechanism to be capable of moving along a second line perpendicular to the first plane surface, a CNC system controlling the servomechanisms so that a work piece can be worked and measured according to instructions stored therein and a computer connected to the CNC system and capable of governing the instructions.

1 Claim, 11 Drawing Figures

CNC GRINDING MACHINE

BACKGROUND OF THE INVENTION

The present invention relates to a grinding machine, and more particularly to a grinding machine which has a work station capable of translating along and rotating on a horzontal plane and has a grinding wheel capable of translating along the normal line of the horizontal plane and rotating on a vertical plane.

Conventional gear grinding machines all utilize mechanical equipments, e.g. the gear, the angle-dividing plate, the base circle block, the steel band, the connecting rod, the cam . . . etc., in order to manipulate the relative motion between the grinding wheel thereon and a work piece. Owing to the nature of those mechanical equipments, it is imperative that a different work piece demand that the fittings of those equipments need be adjusted or replaced, such as a different tooth number of a gear calls for the replacing of the angle dividing plate or an angle dividing gear; a different pressure angle of the gear demands the changing of the grinding wheel; a different gear makes necessary that the base circle block is replaced and the tension of the steel band is adjusted; a different helical angle of the gear results in the compulsory replacement or adjustment of the guiding mechanism; and modifying the tooth shape or lead of a gear needs the replacing of a cam. Thus, it is rather complicated to set working conditions for a new work piece in the conventional grinding machine.

Furthermore, due to the fact that an initial setting cannot have a work piece achieved a desired accuracy, it is necessary to experimentally grind a tooth of a gear or a work piece and thereafter to send the work piece to a gear measuring device to find out errors thereon. And then, in accordance with empirical judgements, necessary parameters are amended in order to set the above equipments under a new working conditions. Such procedures, which must be repititiously operated until the gear or the tooth in experimental grind ahieves a desired accuracy, not only are time-consuming but also require skilled technicians.

Since the grinding machine and measuring device are conventionally separately built, the work piece must repeatedly be mounted on one of them and then be detached therefrom to be mounted on the other one. Such a procedure is (1) laborious, particularly ture for a heavy work piece; and (2) is prone to ensue errors since the work piece is not exactly clamped at the same point when grinded and measured.

The conventional gear grinding machine and gear measuring device can only work on an involute gear (having involute teeth) and cannot work on a non-involute gear, e.g. a cycloidal gear. ·

Conventionally, a specific cam demands a specifically designed grinding machine. In addition, it is a matter of course that the above problems encountered in gear grinding will be more seriously encountered in cam grinding.

Conventionally, either a gear grinding machine or a cam grinding machine can only adopt either the generating type or the shaping type. The former type means that with a basic geometrical shape of rim of the grinding wheel, a particular curved surface in space can be generated by a specific relative movement between the grinding wheel and the work piece. The latter means that after the rim of the grinding wheel has been dressed to a particular shape, upon working, it is necessary to feed the grinding wheel and to divide the angle on the work piece only.

For the above reasons, diverse single-function grinding machines can be found in the market places with each machine having the following disadvantages that: (1) it has a narrow working range; (2) is requires a well-trained operation; (3) it is laborious to set working conditions for the first work piece; (4) the accuracy of the work piece is user-dependent which results in a high variational characteristic of the accuracy of the work piece worked; and (5) the quality control of the work piece is thus difficult.

It is therefore attempted by the applicant to deal with the above situations encountered by the prior art.

SUMMARY OF THE INVENTION

It is therefore an object of the present invention to provide a CNC grinding machine which makes possible that the work piece can be exactly clamped at the same point when grinding and measured.

It is therefore another object of the present invention to provide a CNC grinding machine which is capable of working a work piece by either the generating type or the shaping type.

It is further an object of the present invention to provide a CNC grinding machine which can produce either an involute or a non-involute work piece.

It is yet an object of the present invention to provide a CNC gringing machine which can produce a work piece neither user-dependent nor time-consuming.

It is an additional object of the present invention to provide a CNC grinding machine which bears a wide working range, i.e. can produce kinds of work pieces now unobtainable in the market places.

According to the present invention, a CNC grinding machine includes a base having a first plane surface which can be defined by a first and a second axes perpendicular with each other and having a first and a second servomechanisms, a work station capable of mounting thereon a work piece and driven by the first servomechanism to be capable of moving on the first plane surface and rotating about a third axis perpendicular to the first plane surface, a grinding wheel mounted on the base and driven by the second servomechanism to be capable of moving along a first line perpendicular to the first plane surface and rotating about a fourth axis perpendicular to a second plane surface having a normal line parallel to the first plane surface, a measuring probe mounted on the base and capable of moving along a second line pependicular to the first plane surface, a CNC system capable of controlling the first and second servomechanisms so that the CNC grinding machine can work on the work piece according to a first plurality of instructions stored in the CNC system and can measure the accuracy of the work piece after it has been worked according to a second plurality of instructions stored in the CNC system and a computer connected to the CNC system and capable of governing the first and second pluralities of instructions.

Certainly, the CNC grinding machine can be further provided with a grinding wheel dresser mounted on the base in a position proximal to the grinding wheel and capable of dressing the grinding wheel.

Certainly, the first and second lines can be positioned to constitute a third plane surface parallel to the second plane surface.

Certainly, the measuring probe can also be independently driven by a third servomechanism which is mounted in the base and controlled by the CNC system and the fourth axis is parallel to one of the first and second axes.

Certainly, nevertheless, the grinding wheel dresser can also be mounted on the work station and is capable of dressing the grinding wheel so that the CNC grinding machine can selectively work the work piece by one of the generating and the shaping types for working the work piece.

Preferably the CNC grinding machine is further provided with a top piece, which is mounted on the work station and is capable of moving along the third axis, for urging the work piece being well secured on the work station.

Certainly, the above mentioned computer can include a microcomputer capable of inputting a first NC program to the CNC system, monitoring the feedback signals resulted by the first, second and third servomechanisms, calculating the errors on the work piece after which has been processed by the CNC grinding machine in accordance with the first and second pluralities of instructions and thereafter amending the first NC program according to the errors and acting as the medium of inputting/outputting data, and a main computer connected to the microcomputer graphic and data communications therebetween and capable of inputting a second NC program to the CNC system.

Certainly, the work station can include a first support capable of moving along the first axis, a second support mounted on the first support and capable of moving along the second axis and a third support mounted on the second support and capable of rotating about the third axis.

Certainly, the CNC grinding machine can further be provided with a fourth support mounted on the base and capable of rotating about the fourth axis and a fifth support mounted on the fourth support, capable of moving along a third line perpendicular to the first plane surface and capable of mounting thereon said grinding wheel.

The present invention may best be understood with reference to the accompanying drawings, in which:

DETAILED DESCRIPTION OF THE PREFERRED EMBODIMENT

Figure 1:
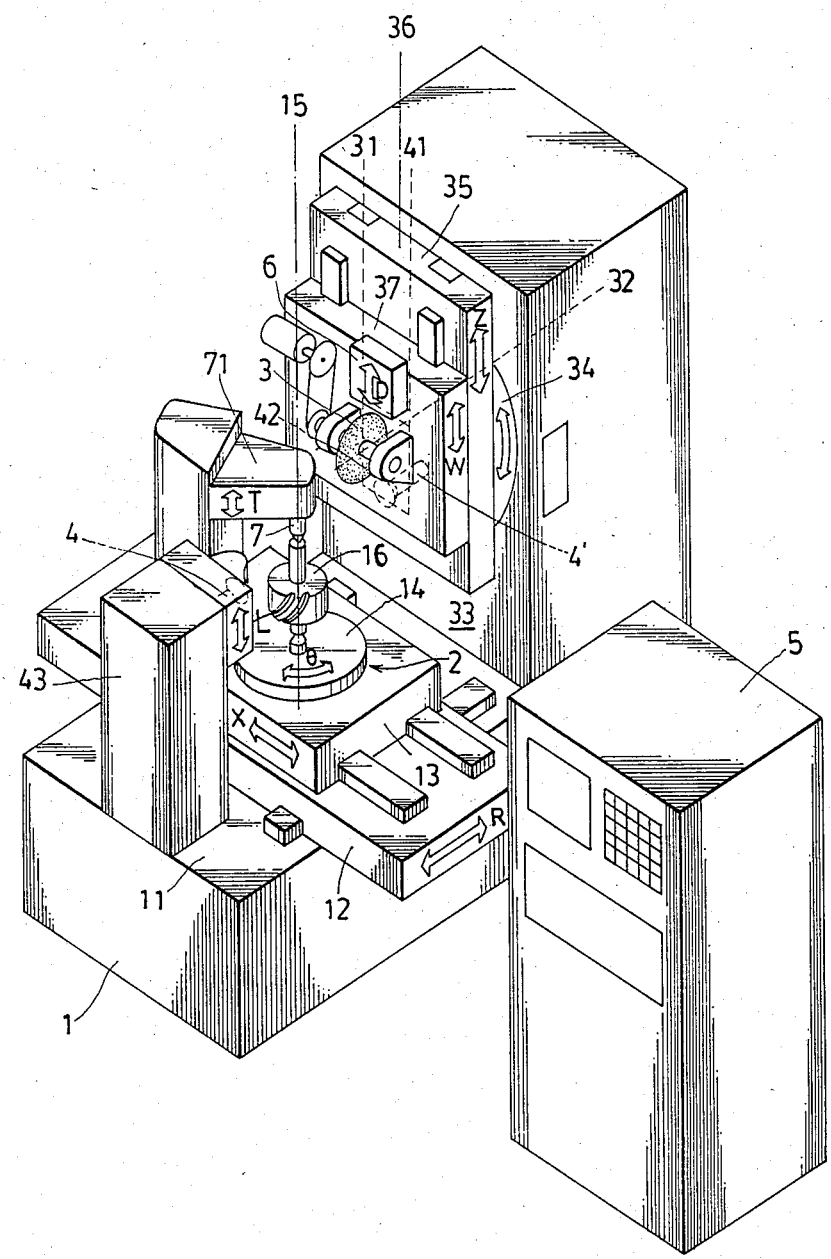
FIG. 1 is a perspective view showing a preferred embodiment of a CNC grinding machine of the present invention.

Referring now to FIG. 1, there is shown a perspective view of a CNC grinding machine of the present invention which includes a base 1, a work station 2, a grinding wheel 3, a measuring probe 4, a CNC system 5, a grinding wheel dresser 6 and a top piece 7. Base 1 has a first plane surface 11 which can be defined by a first, R (or X), and a second, X (or R), axes perpendicular with each other and has a first, a second and a third servomechanisms (not shown). Work station 2, which includes a first support 12 capable of moving along first axis R, a second support 13 mounted on first support 12 and capable of moving along second axis X and a third support 14 mounted on second support 13 and capable of rotating about a third axis 15, is capable of mounting thereon a work piece 16 and is driven by the first servomechanism to be capable of moving on first plane 11 and rotating about third axis 15 perpendicular to first plane surface 11. Grinding wheel 3 is driven by the second servomechanism to be capable of moving along a first line 31 perpendicular to first plane surface 11 and rotating about a fourth axis 32 perpendicular to a second plane surface 33 having a normal line parallel to first plane surface 11. A fourth support 34, rotatably mounted on second plane surface 33, preferably with a rotating range of ±90°, and capable of rotating about fourth axis 32, is mounted thereon a fifth support 35 which is capable of moving along a third line 36 perpendicular to first plane surface 11, i.e. in the direction shown by arrow Z and is mounted thereon a positioning block 37 which grinding wheel 3 is mounted upon and can move in the direction shown by arrow W within a set range which certainly, can also be controlled by the second servomechanism if desired. Measuring probe 4 can be mounted on the dotted place 4' on positioning block 37 and thus will be capable of moving along a second line 41 which is perpendicular to first plane surface 11 and will together with first line 31 constitute a third plane surface 42 parallel to second plane surface 33. Certainly, measuring probe 4 can be mounted in a sixth support 43 mounted on base 1 and be driven by the third servomechanism to be capable of moving along the direction as shown by arrow L perpendicular to first plane surface 11. It is better for fourth axis 32 to be parallel to one of first and second axes R and X (in this instance, it is R axis). Grinding wheel dresser 6, which can include three dressing tools for dressing a grinding wheel for working a work piece by the generating type, can be shown in this figure be mounted on positioning block 37 and be capable of moving in the direction as shown by arrow D, and can be driven by the second servomechanism if desired. Top piece 7 is mounted on a securing block 71, which is capable of moving in the direction as shown by arrow T, i.e. the direction of third axis 15, for urging work piece 16 being well secured on work station 2. CNC system 5 is capable of controlling the first, second and third servomechanisms to enable that the present CNC grinding machine can work on work piece 16 according to a first plurality of instructions stored in CNC system 5 and can measure the accuracy of work piece 16 after which has been worked according to a second plurality of instructions stored therein. Certainly, a computer can be introduced into the present grinding machine to be connected to CNC system 5 to govern the first and second pluralities of instructions to enable the present grinding machine to satisfactorily work out a work piece fully anticipated.

Figure 2A:
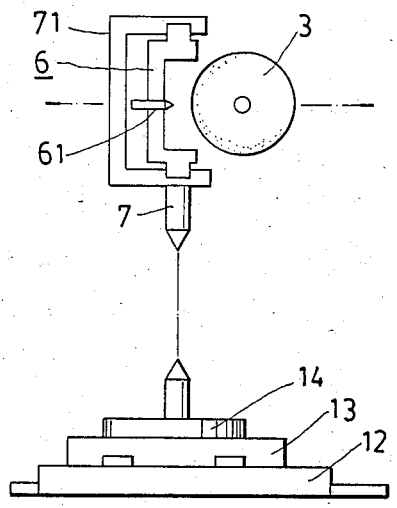
FIG. 2A is a schematic view showing a grinding wheel dresser, mounted on a top piece on the work station of the CNC grinding machine, dressing a grinding wheel.
Figure 2B:
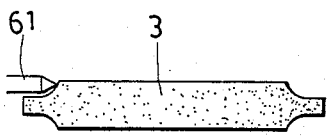
FIG. 2B is a sectional view showing a grinding wheel dressed by the grinding wheel dresser.
Figure 2C:
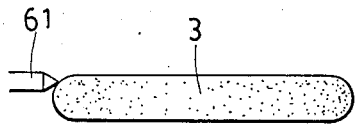
FIG. 2C is a sectional view showing further a grinding wheel dressed by the grinding wheel dresser.

As shown in FIG. 2A, grinding wheel dresser 6, which can also be mounted on securing block 71 alternatively, can only include a dressing tool 61 and thus, by the cooperation of the movements of work station 2 and grinding wheel 3, any kind of crosssection of grinding wheel 3 can be obtained. As examples only, FIGS. 2C and 2B show two kinds of crosssection of grinding wheel 3 dressed by such a grinding wheel dresser 6. With various kinds of crosssection of grinding wheels thus obtained, the present CNC grinding machine can selectively work work piece 16 by either the generating or the shaping type for working work pieces.

Figure 3:
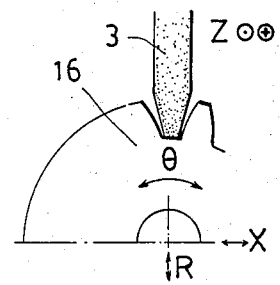
FIG. 3 is a schematic view showing the CNC grinding machine in working an involute gear.

FIG. 3 is a schematic view showing how the present CNC grinding machine works an involute gear. The rotation angle $\theta$ of work station 2 about third axis 15 and the translation x of work station 2 along x axis have a constant mathematic relation, i.e.

$x = k \cdot \theta$, where
$k = 0.5 \ M \cdot Z \ * \cos Ag / \cos Aw$, where
$M$ = the modulus of the work piece,
$Z$ = the tooth number of the work piece,
$Ag$ = the pressure angle in the pitch circle of the work piece, and
$Aw$ = the pressure angle in the pitch circle of the grinding wheel.

The translation in R axis will govern the tooth thickness of the work piece and upon cooperating with the translation in Z direction of grinding wheel 3, will be capable of tooth crowning and modifying the lead for the work piece. Certainly, the Z direction is further controlled by fourth support 34 as apparent by the above description.

A non-involute gear, e.g. a cycloical gear, can be produced by the generating type by using a specially dressed grinding wheel, e.g. the grinding wheel shown in FIG. 2C, produced by the manner as shown in FIG. 2A. Certainly, if a gear is desired to be produced by the shaping type, a suitable grinding wheel, e.g. the grinding wheel shown in FIG. 2B, can be used.

Figure 4A:
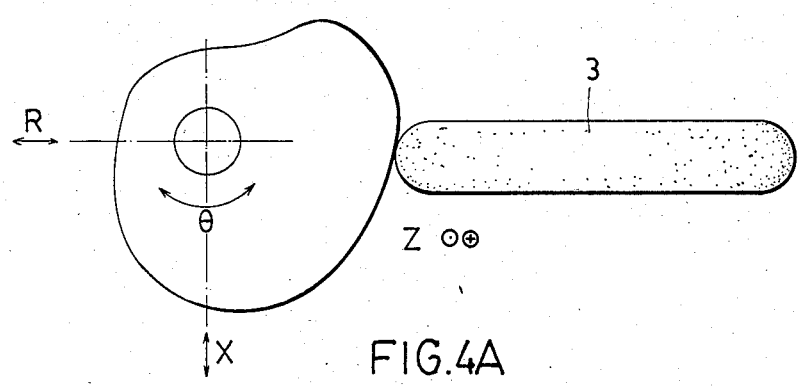
FIG. 4A is a schematic view showing a CNC grinding machine of the present invention working a cam.

As shown in FIG. 4A, a cam can be worked by the present CNC grinding machine by the cooperation of tanslations in R axis, X axis, Z direction and rotation angle $\theta$ about third axis 15.

Figure 4B:
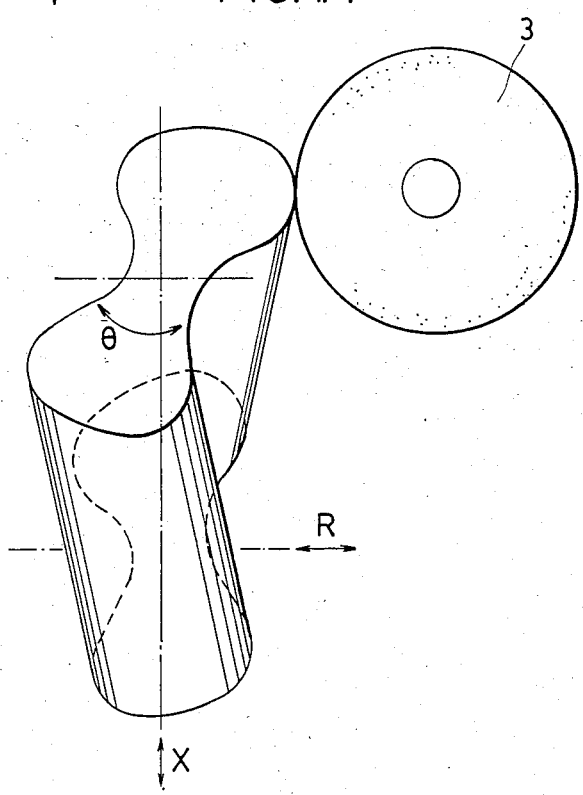
FIG. 4B is a schematic view showing a CNC grinding machine of the present invention working a peculiar cam.

As shown in FIG. 4B, a peculiar cam can also be produced by the present CNC grinding machine by the cooperation of translations in R axis, X axis, Z direction and rotations about third axis 15 and fourth axis 32.

Figure 5:
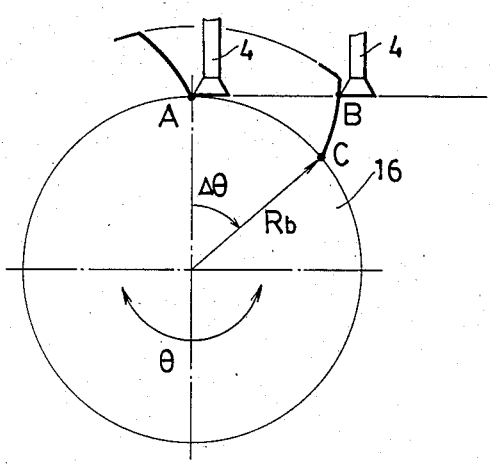
FIG. 5 is a schematic view showing how a measuring probe of a CNC grinding machine of the present invention measures an involute gear.

FIG. 5 shows how can the present CNC grinding machine measure the accuracy of an involute gear worked thereby. By definition of an involute, $\overline{AB} = AC$, thus, the travelling displacement $\Delta x$ of measuring probe 4 along X axis will be equal to the rotation angle $\Delta \theta$ multiplied by the radius Rb of the base circle of the work piece, i.e. $\Delta x = Rb \cdot \alpha \theta$.

Since the displacement $\Delta L$ of measuring probe 4 in L direction and the rotation angle $\Delta \theta$ of the work piece have a constant relationship, i.e. $\Delta L = L \cdot \Delta \theta 2\pi$, wherein L is the lead of work piece, the lead of a gear can be obtained thereby.

By the provisions of measuring probe 4 (or a double measuring probe) and the first servo mechanism, the pitch error, the angle-dividing error and the other error on the work piece can be detected.

Since a cam is designed in a cylindrical coordinate, it is apparent from the foregoing structural description of the CNC grinding machine that the cam can also be measured to find out possible kinds of errors by the present CNC grinding machine.

For example, in computerizing the present CNC grinding machine for producing an involute-tooth gear by the generating type, the following fomulas are introduced:

$T = Rrolling * \theta$
$Rroling = Rb / \cos \{\tan^{-1} (\tan Awn / \cos Aw)\}$
$Rb = Mn * Z * 0.5 \cos \{\tan^{-1} (\tan An / \cos A)\} / \cos A$
$B = \tan^{-1} (\tan An / \cos A)$
$Ab = \tan^{-1} (\tan A * \cos B)$
$Aw = \sin^{-1} (\sin Ab / \cos Awn)$ where
$\theta$ = rolling angle (rotation angle about third axis 15)
Rrolling = the radius of the rolling circle
Rb = the radius of the base circle of the work piece
A = the helical angle in the pitch circle of the work piece
Ab = the helical angle in the base circle of the work piece
An = the pressure angle of the work piece
Aw = the helical angle of the grinding wheel
Awn = the pressure angle of the grinding wheel
B = the pressure angle on the crosssection perpendicular to the axis of the work piece
Mn = the modulus of the work piece
Z = the tooth number of the work piece
T = displacement along X axis For calculating displacement T to be used by CNC system 5 when the above formulas are used for grinding the involute gear, only the following data need be inputted, i.e. Mn, Z, An, A, Awn and $\theta$.

For calculating displacement T to be used by CNC system 5 when the above formulas are used for measuring the involute gear if a basic circle rolling method, i.e. Rrolling = Rb, is used, only the following data need be inputted, i.e. Mn, Z, An, A and $\theta$.

Figure 6:
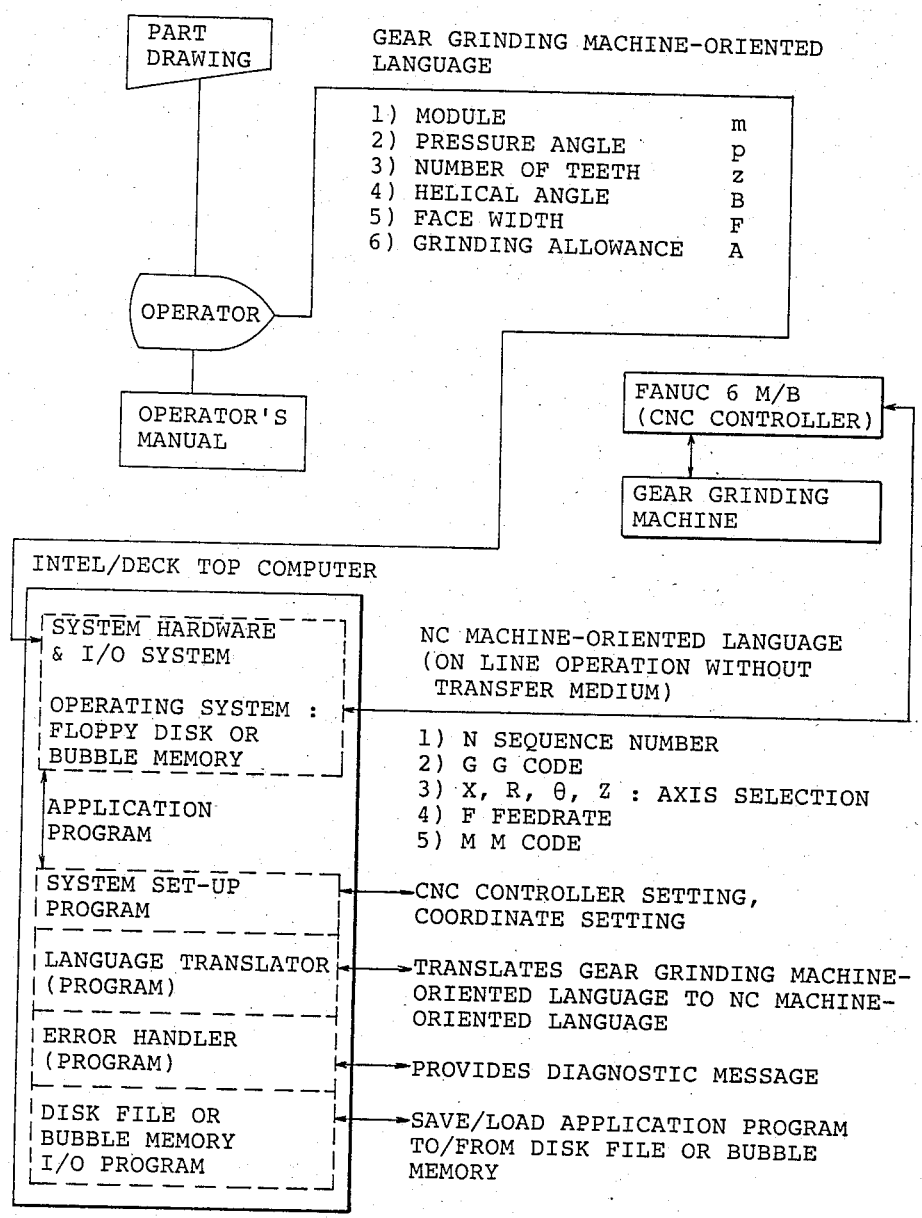
FIG. 6 is a flowchart showing a CNC grinding machine of the present invention in grinding an involute gear.
Figure 7:
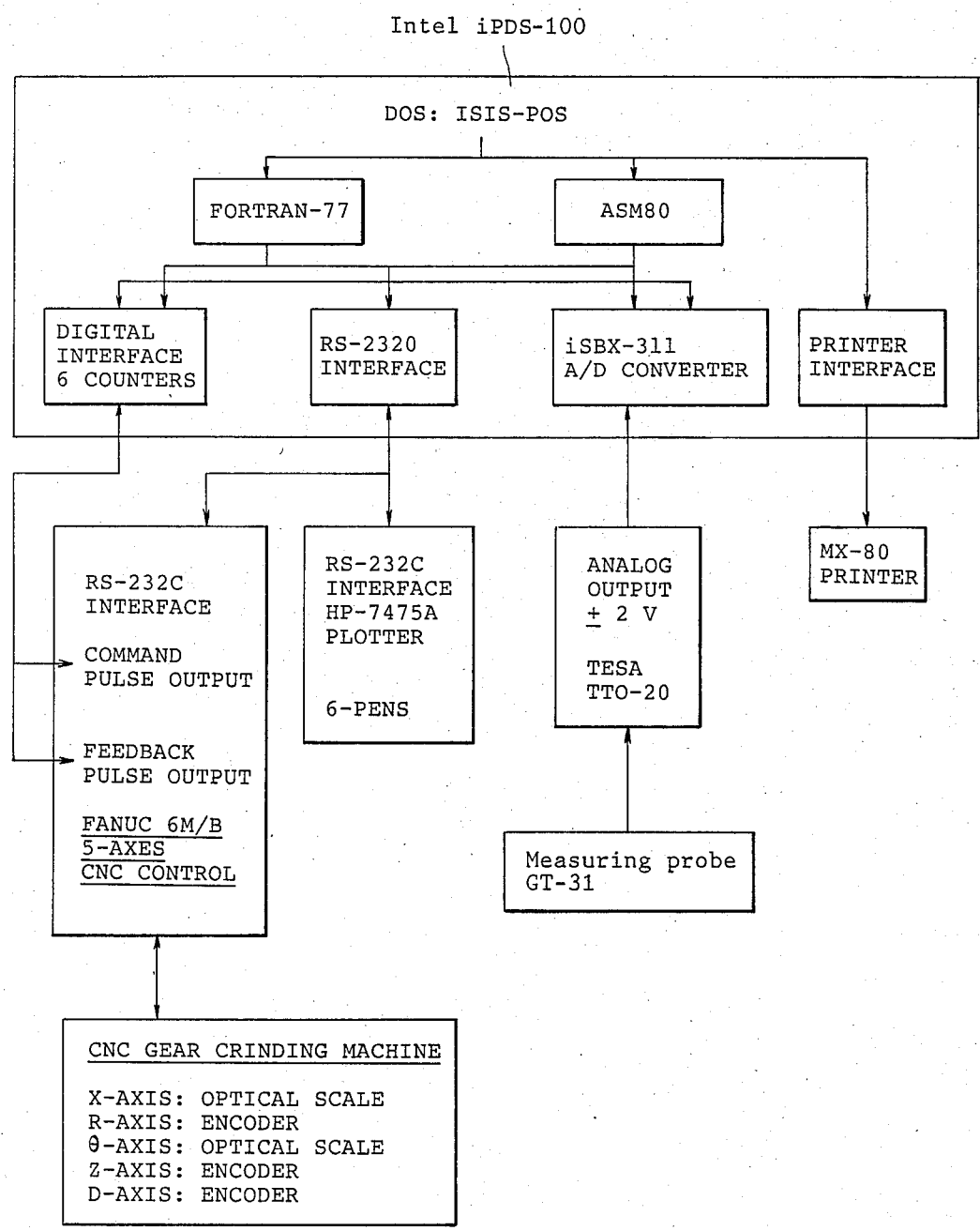
FIG. 7 is a flowchart showing a CNC grinding machine of the present invention in measuring an involute gear.

FIG. 6 shows a flow chart showing a CNC grinding machine of the present invention in grinding when the CNC grinding machine is equipped with the INTEL/deck top computer and adopts the FANUC as CNC system 5. FIG. 7 shows a flow chart showing the CNC grinding machine in FIG. 6 in measuring.

Figure 8:
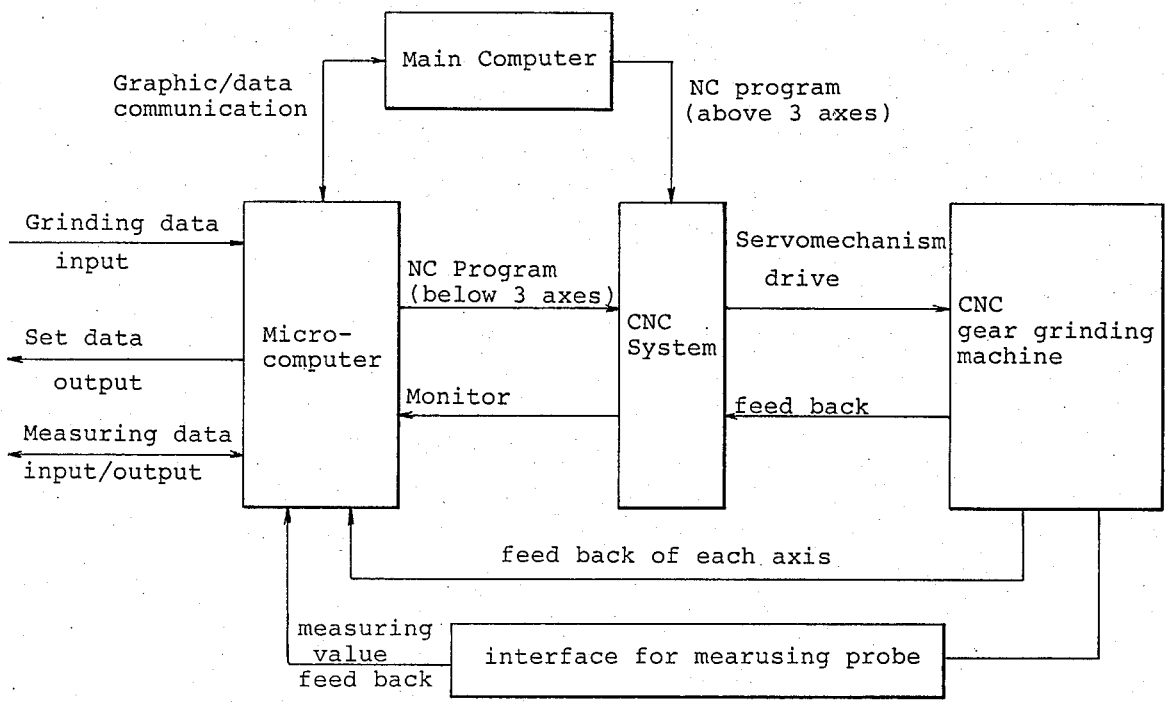
FIG. 8 is a systematic structural diagram of a CNC grinding machine of the present invention.

If desired, as shown in FIG. 8, there is shown a systematic structural diagram of a CNC grinding machine of the present invention, which can be equipped with a microcomputer, e.g. of the type as shown in FIGS. 6 and 7, and a main computer for performing a more complicated grinding and measuring. The microcomputer is capable of inputting a first NC program, which contains normally below 3 axes-control, to CNC system 5, monitoring the feedback signals resulted by the first, second and third servomechanisms, calculating the errors on the work piece after which has been processed by the CNC grinding machine in accordance with the first and second pluralities of instructions and thereafter amending the frist NC program according to the errors and acting as the medium of inputting/outputting data. The main computer is connected to the microcomputer for graphic and data communications therebetween and is capable of inputting a second NC program, which normally contains above 3 axes-control for a more complicated working, to CNC system 5.

While the present invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A CNC grinding machine for grinding a workpiece such as a gear or a cam, comprising:
   - a base located in a horizontal first plane formed by two perpendicular axes;
   - a work station capable of mounting thereon said workpiece, and driven by a first servomechanism to be capable of moving in said first plane and rotating about a third axis perpendicular to said first plane;
   - a column defined in a second plane perpendicular to said first plane and one of said two axes thereof;
   - a grinding wheel driven by a second servomechanism to be capable of moving along a first line on said second plane; said first line being rotatable about a fourth axis perpendicular to said second plane;
   - a CNC system including an NC controller and a computer for controlling said first and second servomechanism to work on said workpiece according to an initial grinding program;
   - a measuring probe mounted on said base driven by a third servomechanism controlled by said CNC system, and capable of moving along a second line perpendicular to said first plane;
   - a securing block mounted on said work station for ensuring that said workpiece is well secured thereon;
   - a grinding wheel dresser mounted on said securing block, and capable of moving and rotating in cooperation with said work station;
   - a measuring program contained in said CNC system for controlling the movements of said first and third servomechanisms to measure the working errors on said workpiece after a testgrinding for amending said initial grinding program; and
   - a wheel-dressing program contained in said CNC system for controlling the movements of said first and second servomechanisms to dress the grinding wheel as needed.

* * * * *